United States Patent [19]
Vecchiarino

[11] Patent Number: 5,530,327
[45] Date of Patent: Jun. 25, 1996

[54] DEVICE FOR CONTROLLING THE ROTATION OF A DOOR MIRROR UP TO PRESET POSITION

[75] Inventor: Luigi Vecchiarino, Vaprio d'Adda, Italy

[73] Assignee: Commer S.p.A., Salerno, Italy

[21] Appl. No.: 165,606

[22] Filed: Dec. 13, 1993

[30] Foreign Application Priority Data

Dec. 11, 1992 [IT] Italy .................................. MI92A2834

[51] Int. Cl.$^6$ ...................................................... B60R 1/06
[52] U.S. Cl. ............................ 318/293; 318/466; 359/872
[58] Field of Search ............................... 318/293, DIG. 2, 318/291, 286, 489, 466; 359/841, 877, 507, 874, 873, 872

[56] References Cited

U.S. PATENT DOCUMENTS

| 3,936,158 | 2/1976 | Cianciolo et al. | 359/873 |
|---|---|---|---|
| 4,626,084 | 12/1986 | Kumai | 354/841 |
| 4,679,158 | 7/1987 | Tate | 250/224 |
| 4,786,157 | 11/1988 | Mori et al. | 350/637 |
| 4,815,837 | 3/1989 | Kikuchi et al. | 359/874 |
| 4,911,565 | 3/1990 | Miller | 400/485 |
| 4,919,526 | 4/1990 | Umekawa et al. | 359/841 |
| 4,936,670 | 6/1990 | Yoo | 359/877 |
| 4,981,347 | 1/1991 | Nakayama | 318/484 |
| 5,210,652 | 5/1993 | Perkinson | 359/841 |
| 5,268,619 | 12/1993 | Vecchiarino | 318/3 |
| 5,353,466 | 10/1994 | Smith et al. | 318/DIG. 2 |

FOREIGN PATENT DOCUMENTS

| 00219560 | 3/1993 | Argentina . |
| 0289052 | 11/1988 | European Pat. Off. . |
| 0305590 | 3/1989 | European Pat. Off. . |
| 0545197 | 6/1993 | European Pat. Off. . |
| 61-222841 | 10/1986 | Japan . |

Primary Examiner—John W. Cabeca
Attorney, Agent, or Firm—Millen, White, Zelano, & Branigan

[57] ABSTRACT

A device for the controlled rotation of the cover of a door mirror in a motor vehicle comprises a DC fed electric motor to allow the motorized rotation of the cover and an electronic circuit enabling the electric motor. A plurality of feed tracks and a plurality of sliding contacts thereon selectively cut out or enable the connections to one or more sections of the circuit in correspondence with positions of the mirror cover different from the preset positions.

The transmission of the rotational movement from the motor to the cover is ensured by a train of gears in which one or more friction elements are inserted.

Elastic means are also foreseen for retaining and positioning the cover in respect to the fixed base, to exert, together with said friction elements, different forces of reaction that oppose the relative movement between the cover and the fixed base of the door mirror.

18 Claims, 4 Drawing Sheets

DEVICE FOR CONTROLLING THE ROTATION OF A DOOR MIRROR UP TO PRESET POSITION

BACKGROUND OF THE INVENTION

Field of the Invention

The invention concerns a device for controlling the rotation of door mirrors in motor vehicles.

It is known that the current safety regulations prescribe the collapsibility, under the action of a predetermined force, of the mobile portion of door mirrors, namely the outer cover as well as all the components contained therein and supported therewith by the mirror frame, in respect to a fixed base integral to the vehicle. However the resistance to turnover of the mobile portion of the door mirror must be such as to guarantee at least the maintenance of the outer cover position during the vehicle ride.

There is at the same time the need of allowing a controlled, not casual rotation of the mobile portion up to a predetermined reference position by means of an electric motor.

The solutions proposed in the known technique involve considerable manufacturing difficulties since it is necessary to take into consideration different requirements as regards the cover resistance to shift.

The previous European Patent Application N. 92119911.3 filed by the Applicant proposed a device to perform the controlled rotation of the door mirror by means of an electric motor, wherein the movement of the mobile portion of the door mirror, namely the casing and the outer cover integral thereto, is controlled by a microswitch that allows to detect the only operative position of the door mirror.

Said microswitch enables the electric motor actuation only when the mobile portion of door mirror is in one of preset positions, typically an operative position (or ride position) and a rest position (or parking position) due to a rotation caused by the electric motor. On the contrary, if the rotation takes place because of an external force applied to the movable portion, it is necessary to manually reposition said movable portion in the only operative position. This is due to the presence of a ring provided between the cover and the fixed base, said ring being coupled to the outer cover by means of friction elements and to the fixed base by means of retaining and positioning elastic means of known type (see the Italian Utility Model N. 219560 filed by the Applicant). During the manual rotation of the cover the retaining and positioning elements disengage, while said ring remains coupled with the cover, thanks to said friction elements. The disengagement of the retaining and positioning means involves the changeover of the microswitch and the consequent disablement of the electric motor. On the contrary, in case of motorized rotation, the friction elements, appropriately calibrated, allow the rotation of the outer cover in respect to the ring integral to the fixed base, that is without causing the disengagement of the retaining means and the consequent disablement of the electric motor by the microswitch.

This kind of configuration, though having proved to be functionally effective, involves the use of a very powerful and therefore cumbersome motor as well as the use of friction elements of considerable size.

OBJECTS OF THE INVENTION

An object of the present invention is to provide a device to control the rotation of a door mirror allowing an automatic repositioning of the movable portion thereof, namely the correct positioning in one of the preset positions without any manual intervention.

A further object of the present invention is to provide a device for the door mirror rotation having limited size and requiring a little electric power to be actuated.

SUMMARY OF THE INVENTION

Said objects are achieved by means of the present invention that concerns a device for the controlled rotation of a mirror outer cover mounted on a turnable casing, in respect to a fixed base, between a position whatsoever and one or more preset positions, the device comprising a DC fed electric motor for the motorized rotation of a mirror outer cover and at least a couple of buttons to actuate the motorized rotation of said cover, characterized in that an enabling electronic circuit is envisaged, comprising: at least a couple of relays and a plurality of diodes to allow the reversal of power polarities to the terminals of said motor; an actuating section for power supply to said electric motor during a preset period of time; as well as a plurality of feed tracks and a plurality of sliding contacts on said tracks to selectively cut out or enable connections to one or more sections of the circuit in correspondence with positions of the mirror cover different from said preset positions.

In particular the cover preset positions comprise an operative or ride position and a rest or parking position, and are obtainable either thanks to forces applied externally to the cover or by means of the device, by acting on the control buttons for motorized rotation. The non preset positions, on the contrary, can only be reached by means of forces applied externally to the cover.

In a preferred embodiment of the invention the device comprises a plurality of gears, accomodated in the casing, capable of transmitting the rotational movement from the motor to the outer cover. In the gearing chain there are advantageously provided one or more friction elements, while between the fixed base and the movable casing there are provided retaining and positioning elastic means. The friction elements and the retaining and positioning elastic means exert different reaction forces that oppose the relative movement between the casing and the fixed base of the door mirror.

In this way it is possible to obtain in a very simple manner a device that allows the turnover of the door mirror in compliance with safety regulations and the subsequent restoration of the cover position by means of a motorised rotation.

The invention will be now described more in detail with reference to the accompanying drawings given by way of illustration and with no limiting purposes, wherein:

DESCRIPTION OF THE PREFERRED EMBODIMENTS

Figure 1:
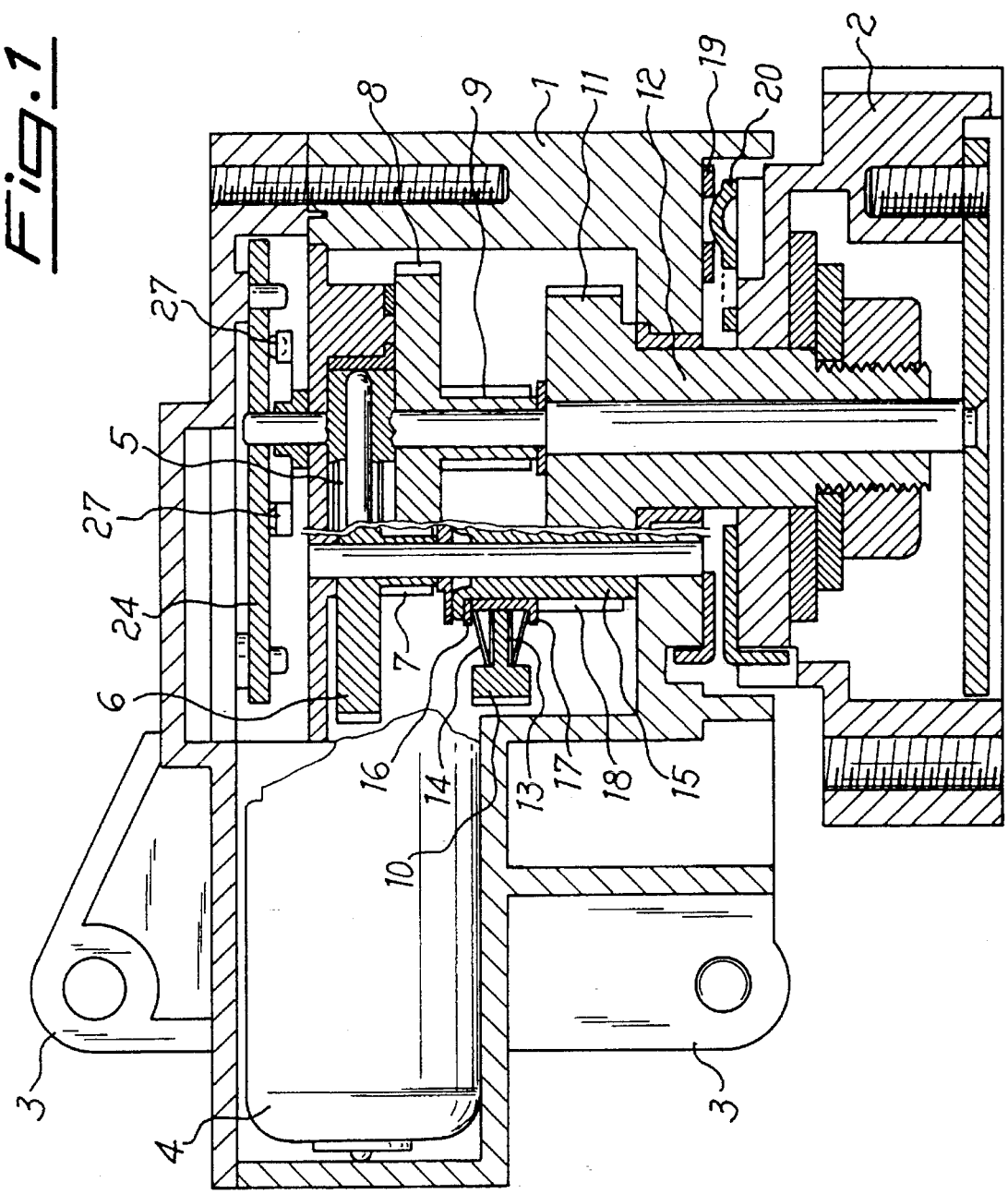
FIG. 1 is a cross sectional view on offset planes of the rotation unit for a door mirror according to a preferred embodiment of the invention.
Figure 2:
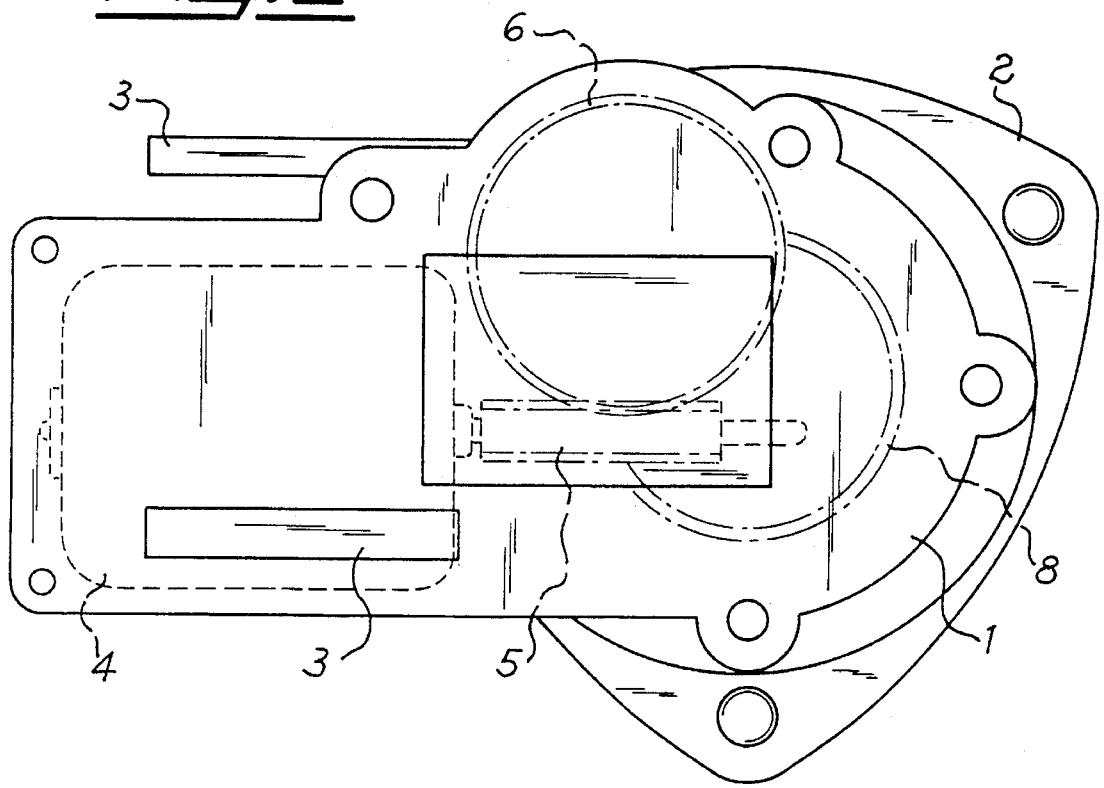
FIG. 2 is a plan view of the arrangement of some components of the device of FIG. 1.

With reference first of all to FIGS. 1 and 2, the device for the controlled rotation of a door mirror comprises an external casing 1 turnable in respect to a fixed base 2. The casing 1 is provided with tabs 3 to which the mirror outer cover (not shown) is fastened.

The rotation obtained by means of external forces applied to the cover and the motorized rotation obtained by means of the device involve a relative movement of the same parts integral to the fixed base 2 and respectively to the casing 1.

It is therefore advantageous to obtain an indication of the relative position between the casing 1 and the fixed base 2, independently of how said position has been reached, envisaging a plurality of feed tracks provided on a printed circuit 24 integral to the casing 1, whereas the sliding contacts 27 are integral to the fixed base 2. It is obviously possible to foreseen a reciprocally inverted arrangement between the printed circuit 24 and sliding contacts 27, or an arrangement in different position, without therefore escaping from the scope of the present invention.

Figure 3:
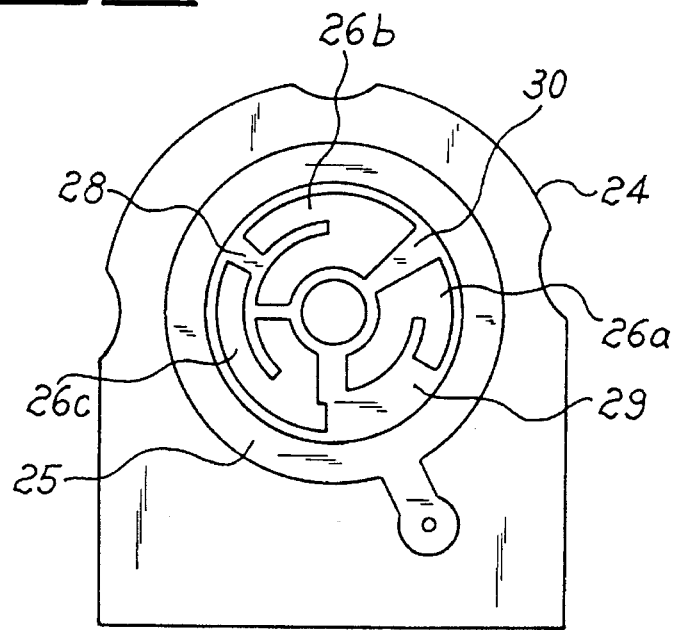
FIG. 3 is a magnified plan view of the printed circuit on the side including the feed tracks.
Figure 4:
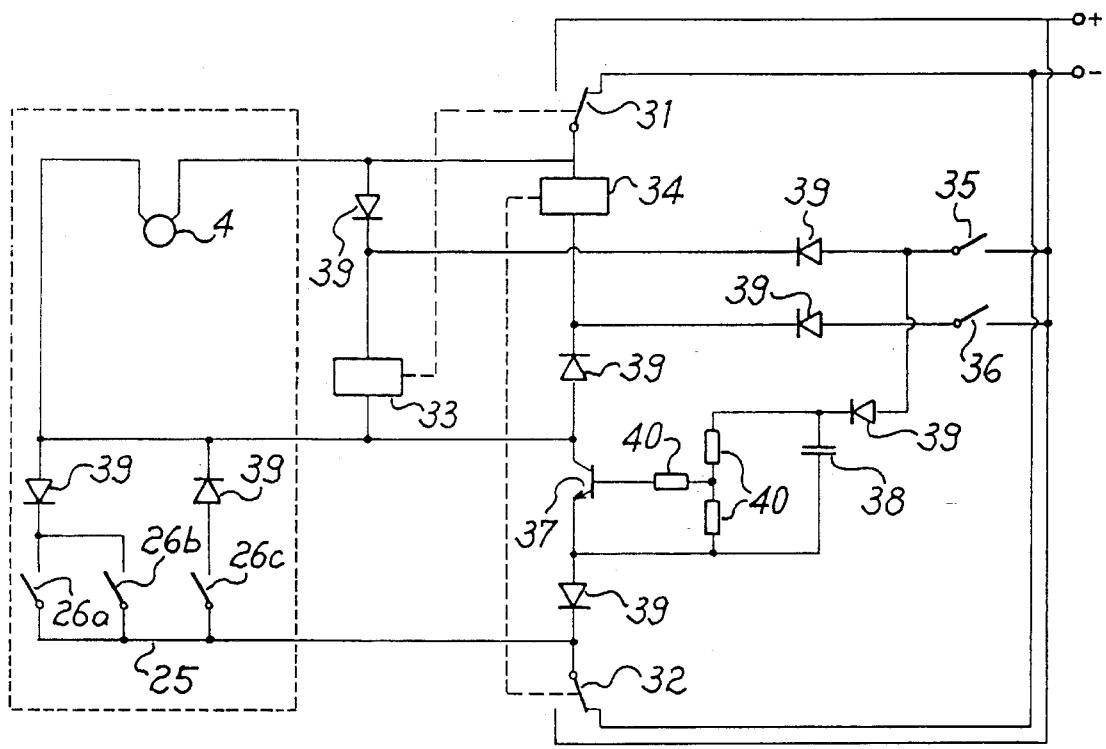
FIG. 4 is a diagram of the electronic circuit actuating the motor.

FIGS. 3 and 4 respectively represent the printed circuit 24 and the electronic circuit enabling the electric motor. With reference to FIG. 4, the electronic circuit comprises a couple of relays 33, 34 with associated respectively change-over switches 31, 32. Relays 33 and 34 allow a polarity reversal of power fed to the terminals of the electric motor 4. A plurality of diodes 39 ensures the isolation of the circuit sections that, according to the power polarity present at a certain moment, would prevent the correct operation of same or could eventually be damaged.

The circuit is also provided with an actuating section to supply power to the electric motor 4 during a preset period of time.

In the preferred embodiment the actuating section comprises a transistor 37, a plurality of polarization resistors 40 and at least a condenser 38 in order to maintain the transistor 37 in the conduction state for a preset period of time starting from the moment in which one of the control buttons 35 or 36 is pressed. In this way, at the moment when one of the control buttons is pressed., for instance botton 35 (or 36), a changeover of the contacts 31 (or 32) of one of the two relays 34 (or 33) takes place, thus ensuring electric supply to the motor 4. Starting from that moment, the transistor 37 remains in its conduction state for a period of time sufficient to ensure that at least one of the sliding contacts 27 reaches one of the tracks of the printed circuit 24 and enables at least one of the connections, for instance 25–26b (or 25–26a, 25–26c), to a previously cut out section of the circuit. This circuit section allows to maintain the relay 34 condition unchanged until one of the preset positions is reached, for instance the position of the vehicle ride, in correspondence to which the relay 34 commutes again cutting out the electric power supply to the motor 4.

Furthermore at least an overload sensor (not shown) is envisaged capable of disconnecting power supply to the electric motor 4. Said sensor is useful in order to avoid damages to the device, for instance in the particular case in which power supply to the electric motor 4 is provided, but the outer cover is blocked in its movement by any obstacle whatever.

FIG. 3 shows a preferred embodiment of the printed circuit 24 on which there are provided a couple of circular and concentric feed tracks 25 and 26, the latter being subdivided into three portions 26a, 26b, 26c.

The outer track 25 represents a feed portion constantly in contact with brushes 27, whereas the tracks 26a, 26b, 26c are separated by non conducting zones 28, 29, 30. Said arrangement allows to obtain a plurality of on and/or off conditions of an electric line (namely a plurality of "switches") as a function of the relative position between the brushes 27 and tracks 25, 26.

In particular said "switches" result to be open in correspondence with the preset positions of the outer cover, namely the ride and parking positions of the vehicle; this means that the brushes 27 are arranged on one of the zones 28, 29 and 30 wherein track 26 is interrupted. On the contrary, in positions different from said preset positions at least one of said switches is closed,. i.e. brushes 27 are arranged on one of the tracks 26a, 26b, 26c.

Moreover, in correspondence with the preset positions, the change-over switches 31 and 32 of relays 33, 34 are both in "rest condition" (or non commuted state) and are connected to the same pole of the power source, for instante to the negative pole.

In the diagram of FIG. 4 the condition of said switches, as well as that of the change-over switches 31, 32 associated with the relevant relays 33 and 34, corresponds for instance to that in which the door mirror is in the ride position.

Also buttons 35 and 36 actuating the "closure" of the door mirror (rotation towards the parking position) and respectively the "opening" of the door mirror (rotation towards the ride position) are of course open.

Therefore, assuming that the door mirror is initially in its operative position, namely that of the vehicle ride, the voluntary closure of the door mirror is performed by momentarily pressing button 35. In this way the transistor 37 conducts and remains in this condition for a period of time t determined by the capacity of the condenser 38. Simultaneously the condition of the change-over switch 32 associated with the relay 34 changes. The motor 4 then starts to rotate and, after a small angle, the brushes 27 close one of the switches, for instant the one between the continuous track 25 and track 26b, keeping the motor fed even after the time interval t. Once the closure occurred, the switch 25–26b opens again (the brushes 27 therefore will be in one of the areas 28 or 30), the motor stops and the condition of the change-over switch 32 associated with the relay 34 changes.

The door mirror can be opened again (rotation from the parking position to the ride position) by momentarily pressing button 36. Similarly to what takes place for voluntary closure, the transistor 37 is in conducting state and remains as such for a time interval t determined by the capacity of condenser 38. Simultaneously the condition of the change-over switch 31 associated with relay 33 changes. The motor 4 then starts to rotate and, after a small angle, the brushes 27 close one of the switches, for instance the one between the continuous track 25 and track 26c, keeping the motor fed even after the time interval t. Once the opening occurred, the switch 25–26c is opened again (brushes 27 will therefore be in one of the areas 28 or 29), the motor stops and the state of the change-over switch 31 associated with relay 33 changes.

In case of "accidental" turnover of the door mirror between the preset positions of ride or parking, it is possible to bring the door mirro back to any of said positions by acting on the control buttons 35 and 36 just as in the cases described hereon. In fact electric supply to the motor 4 is guaranteed, in said positions, by the brushes 27 keeping the contact between the continuous track 25 and one of tracks 26b or 26c, independently from the fact that the transistor 37 is in its state of conduction or of interdiction.

In case of "forward" turnover, namely beyond the ride position, it is possible to bring the door mirror back to said ride position by momentarily pressing button 35. In this way the state of the change-over switch 32 associated with the relay 34 changes, while the brushes 27 close the switch 25–26a to ensure electric supply to the motor 4 until the ride position is reached. At this point the switch 25–26a opens, the motor 4 stops and changes again the state of the change-over switch 32 associated with the relay 34.

Again with reference to FIGS. 1 and 2, the casing 1 accomodates the electric motor 4 as well as the gears and friction elements 13 allowing the transmission of the rotational movement.

According to an advantageous feature of the invention, the friction elements 13 are operatively arranged between two reduction gear units having a direct gear ratio less than 1.

On the shaft of the electric motor 4, a worm screw 5 is keyed and coupled with a first gear wheel 6 with a direct gear ratio less than 1. The gear wheel 6 is turnable around a first axis of rotation perpendicular to the axis of rotation of the worm screw.

A second gear wheel 7, integral and coaxial to the gear wheel 6, is coupled with a third gear wheel 8 with a direct gear ratio greater than 1.

The gear wheel 8 is turnable around a second axis perpendicular to the axis of rotation of worm screw 5 and in particular said second axis of rotation is also parallel to the axis of rotation of gear wheels 6 and 7. A fourth gear wheel 9, integral and coaxial to the gear wheel 8, is coupled to a fifth gear wheel 10 with a direct gear ratio less than 1. In the preferred embodiment, the gear wheel 10 is idlingly mounted on a first supporting bush 17 for the friction elements 13. The gear wheel 10 and supporting bush 17 are coaxial to said first axis of rotation.

On a second bush 15, inserted in the first supporting bush 17 and integral thereto, a sixth gear wheel 18 is mounted integral thereto. Said latter gear wheel 18 is coupled to a seventh gear wheel 11 with a direct gear ratio less than 1. The gear wheel 11 is mounted on a pivot 12 integral to the fixed base 2 and coaxial to said second axis of rotation.

Figure 5:
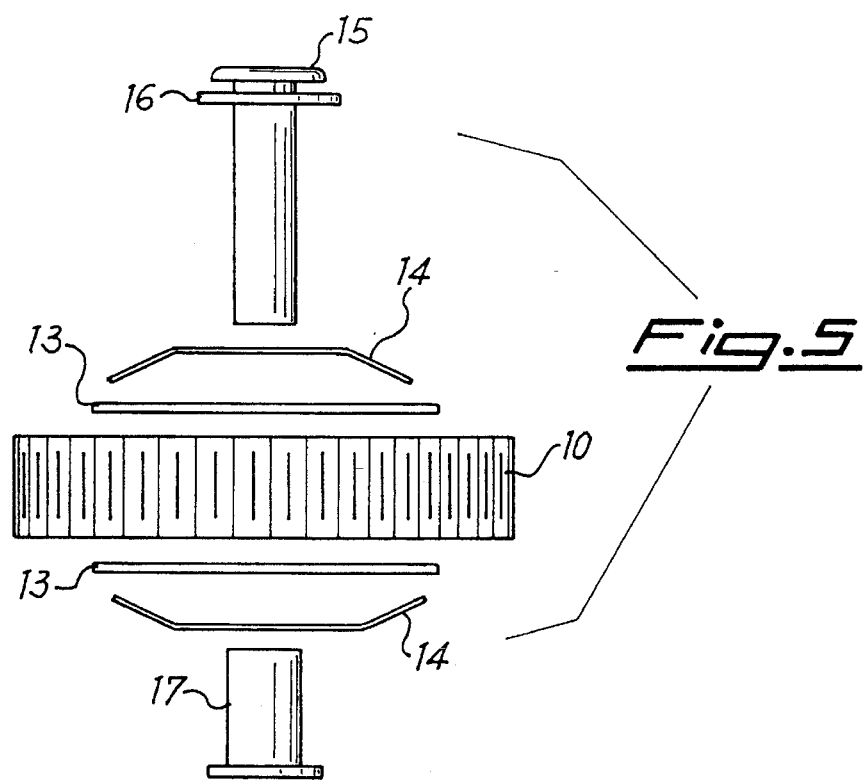
FIG. 5 is a magnified view of some elements of the transmission means.
Figure 8:
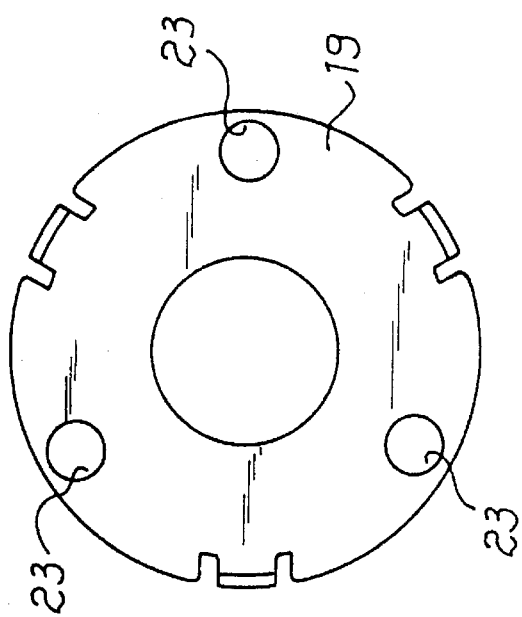
FIGS. 6–9 are views of the retaining and positioning means between the outer cover and the fixed base of the door mirror.
Figure 9:
Figure 6:
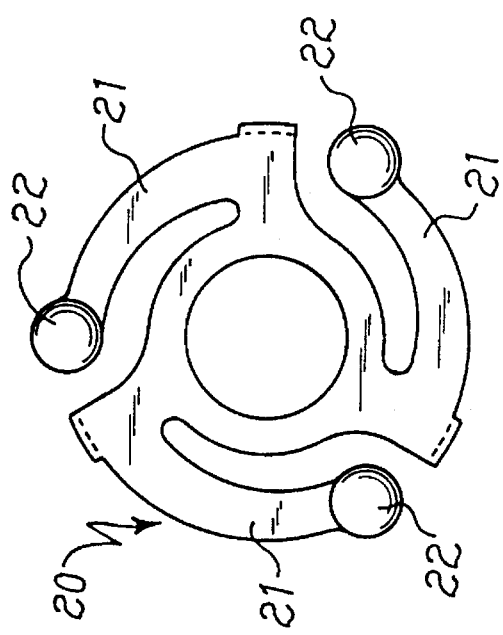
Figure 7:
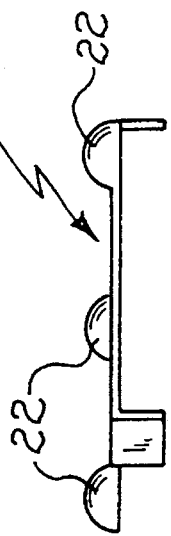

FIG. 5 is a more detailed representation of all the friction elements that, according to the preferred embodiment of the invention, are associated with the gear wheel 10. In particular there are provided two friction disks 13 made of plastic material, for instance an acetalic resin. The disks 13 are pressed against the relevant base surfaces of the gear wheel 10 by means of Belleville washers 14. The gear 10, disks 13 and Belleville washers 14 are pivoted on a bush 17 that is on turn pivoted on a bush 15 having a lower diameter, by interposing a steel washer 16 between the upper Belleville washer 14 and the projecting edge of bush 15. The latter, as well as the bush 17, is integral to the gear wheel 18 (FIG. 1), while the gear 10 is free to rotate in respect to the bush 17 if the friction force exerted by the disks 13 on the base surfaces of gear 10 is overcome.

The device moreover comprises elastic means 19, 20 for retaining and positioning the outer cover of the door mirror in respect to the fixed base 2. Said means, known per se from the previous Italian Utility N. 219560 and the European Patent Application N. 92119911.3 filed by the Applicant, are illustrated in a detailed manner in FIGS. 6 to 9. In particular the retaining and positioning means comprise an elastic element 20, substantially flat, fastened to the fixed base 2 of the door mirror and showing a plurality of arms 21 provided with projections 22. Said projections are elastically movable between a plane position of engagement with a corresponding plurality of seats 23 present on the small plate 19, fastened to the mirror cover, and a flexed position of disengagement from seats 23.

The retaining and positioning means 19, 20 ensure the correct positioning of the door mirror in its operative position and provide a good mechanical resistance to the forces acting on its movable portion during the vehicle ride. In this case the positioning means 19, 20 are coupled with the projections 22 of arms 21 that engage the relevant seats 23 provided on the small plate 19.

In case of motorized rotation of the cover, the force of reaction to the displacement of the casing 1 in respect to the fixed base 2 is exerted only by the retaining and positioning means 19, 20.

On the contrary, in case of rotation of the casing caused by external forces, the intensity of the reaction force that opposes the casing turnover is distributed between the positioning means 19, 20 and the friction elements 13 inserted in the gear train without exceeding the limits established by safety regulations.

Said arrangement in the gearing train allows to obtain in a limited space the transmission of the rotational movement in a direct sense, namely the motorized rotation of the cover in respect to the fixed base 2, while it avoids the transmission of the movement in reversed direction to the gears arranged between the friction elements and the motor 4. In fact said latter case occurs when the displacement of the cover in respect to the fixed base 2 takes place due to external forces applied thereto. In other words, the manual displacement of the outer cover will cause the transmission of the movement to the gear 15 since the gear 11, integral to the fixed base 2, remains still; however, the friction elements 13, calibrated by the Belleville washers 14, slide in respect to the base surfaces of gear 13 because they do not succeed in trasmitting the movement to the reduction unit positioned upstream, namely the one consisting of the worm screw 5 and the gear wheel 6, that has a very high ratio of reversed transmission or even is of a non-reversing type.

Besides allowing the cover turnover, the friction elements 13 actually avoid possible damages to the gears 5, 6 or to the electric motor 4. This is ensured by the different reduction ratios existing between the gears placed upstream and downstream of the friction elements.

Furthermore, in case of "accidental" turnover of the door mirror between the preset positions of ride and parking, it is possible to bring the mirror back to any of said positions by acting on the control buttons of motorized rotation.

I claim:

1. A device for the controlled rotation of the outer cover of a door mirror mounted on a casing turning with respect to a fixed base, between an initial position and one or more preset positions, the device including a DC electric motor for the motorized rotation of the mirror cover and at least a couple of control buttons to actuate the motorized rotation of said cover wherein the improvement comprises an electronic enabling circuit comprising: at least a couple of relays connected through a plurality of diodes for allowing reversal of current polarity to the terminals of said motor; an actuating section for supplying power to said electric motor during a preset period of time; a plurality of feed tracks and a plurality of sliding contacts on said tracks to selectively interrupt or to enable connections to one or more sections of the circuit in correspondence to positions of the mirror cover different from said preset positions.

2. A device according to claim 1, wherein the connections of said one or more sections of the circuit are interrupted in correspondence to said preset positions of the cover, while, in correspondence to positions different from said preset positions, at least one of said connections is enabled.

3. A device according to claim 2, wherein said feed tracks are integral with said casing and said sliding contacts are integral with said fixed base.

4. A device according to claim 1, wherein in said preset positions both the contacts of said relays are in a steady state and are connected to the same pole of the power source.

5. A device according to claim 1, wherein the actuating section of said circuit comprises a transistor, a plurality of polarization resistors and at least a condenser, said resistors and said condenser being able to maintain said transistor in its conduction state for a preset period of time starting when one of said control buttons is pressed.

6. A device according to claim 1, wherein said control buttons are operatively connected to activate the changeover of the contacts of said relays and thus ensure electric power supply to said motor; and wherein said polarization resistors and said condenser maintain the transistor in its conduction state for a time sufficient to ensure that at least one of said sliding contacts reaches said tracks and enables at least one connection to one of said circuit sections.

7. A device according to claim 6, wherein said circuit section is able to maintain the state of said relay until one of said preset positions is reached, in correspondence of which the relay commutes again, cutting out the electric power supply to said motor.

8. A device according to claim 1, of the type comprising a plurality of gears housed in said casing for the transmission of the rotational movement from said motor to said casing, wherein one or more friction elements are inserted in the gear train of movement transmission, and wherein elastic means are provided for retaining and positioning the cover with respect to the fixed base, said friction elements and said retaining and positioning elastic means being capable of exerting different reaction forces that oppose the relative movement between said casing and said fixed base.

9. A device according to claim 8, wherein the reaction force to the motorized rotation of the cover is exerted only by said retaining and positioning means.

10. A device according to claim 9, wherein said cover retaining and positioning means comprise a substantially flat elastic element, fastened to said fixed base or casing, having a plurality of arms provided with projections elastically movable between a plane position for engagement in a corresponding plurality of seats, as provided on the casing or on the fixed base, and a flexed position for disengagement from said seats.

11. A device according to claim 10, wherein said seats are provided in a small positioning plate integral to said casing and wherein said elastic element is fastened to the fixed base of the door mirror.

12. A device according to claim 8, wherein said friction elements are operatively positioned between two reduction gear units having a direct gear ratio less than one.

13. A device according to claim 8, wherein said gears comprise:

a worm screw coupled to a first gear wheel with a direct gear ratio less than one, said worm screw being keyed on the shaft of said electric motor and said first gear wheel being turnable around a first axis of rotation perpendicular to the axis of rotation of said worm screw;

a second cylindrical gear wheel coupled to a third cylindircal wheel with a direct gear ratio greater than one, said second gear wheel being integral and coaxial to said first gear wheel and said third gear wheel being turnable around a second axis perpendicular to the axis of rotation of said worm screw, said first and second axis of rotation being parallel;

a fourth gear wheel coupled to a fifth gear wheel with a direct gear ratio less than one, said fourth gear wheel being integral and coaxial to said third gear wheel, said fifth gear wheel being idlingly mounted on a first bush supporting said friction elements, said fifth gear wheel and said first bush being coaxial to said first axis of rotation;

a sixth gear wheel coupled to a seventh gear wheel with a direct gear ratio less than one, said sixth gear wheel being integral to a second bush inserted in said first bush and integral thereto, said seventh gear wheel being mounted on a pivot integral to said fixed base and coaxial to said second axis of rotation.

14. A device according to claim 13, wherein said friction elements are formed by disks made of plastic material pressed against the opposite base surfaces of said fifth gear wheel by means of Belleville washers.

15. A device according to claim 2, wherein said feed tracks are integral with said fixed base and said sliding contacts are integral with said casing.

16. A device according to claim 1, wherein said feed tracks are integral with said casing and said sliding contacts are integral with said fixed base.

17. A device according to claim 8, wherein said cover retaining and positioning means comprise a substantially flat elastic element, fastened to said fixed base or casing, having a plurality of arms provided with projections elastically movable between a plane position for engagement in a corresponding plurality of seats, as provided on a casing or on the fixed base, and a flexed position for disengagement from, said seats.

18. A device according to claim 12, wherein said friction elements are formed by disks made of plastic material pressed against the opposite base surfaces of said fifth gear wheel by means of Belleville washers.

* * * * *